Patented July 4, 1950

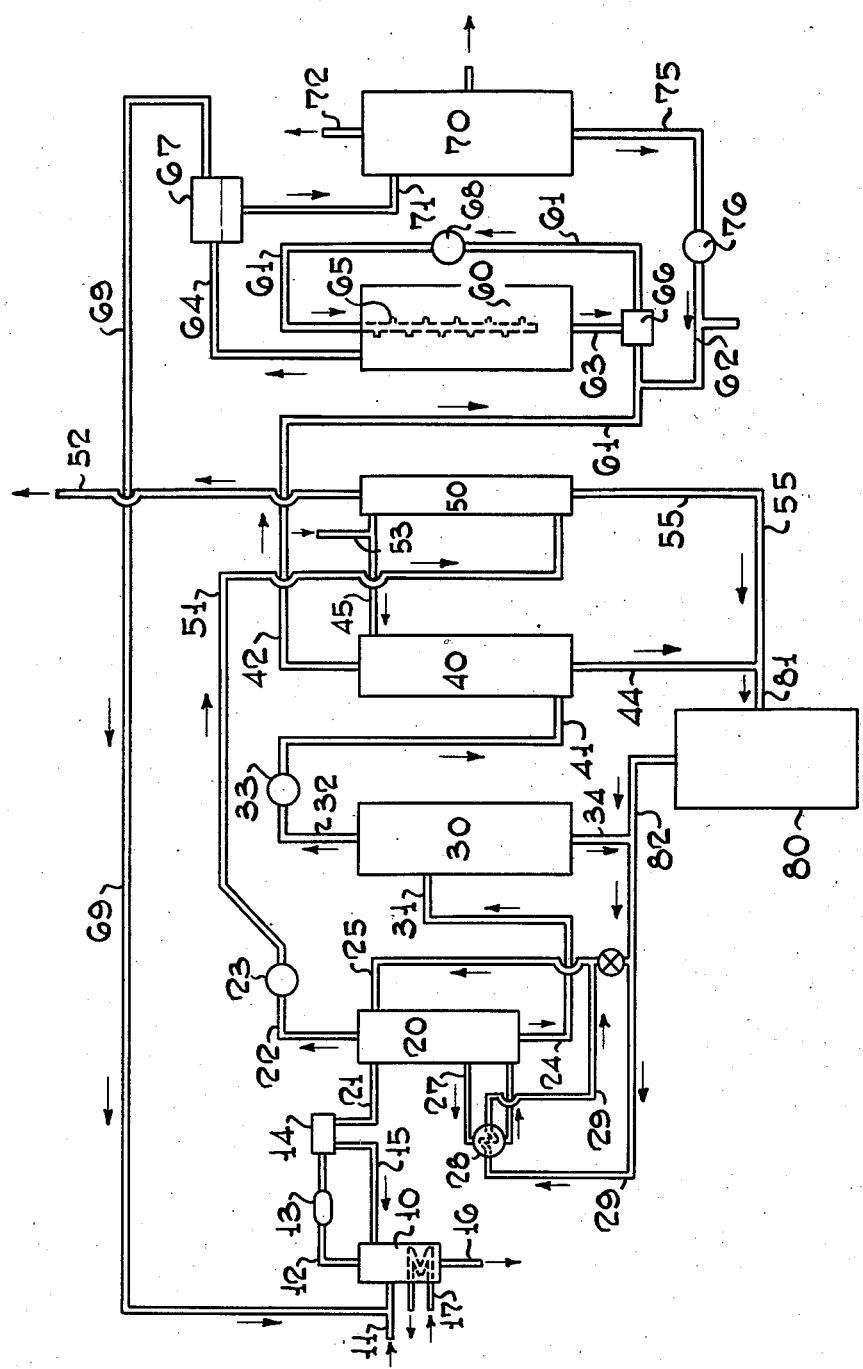

2,514,291

UNITED STATES PATENT OFFICE 2,514,291

PRODUCTION OF SECONDARY BUTYL ALCOHOL

John A. Patterson, Beverly, N. J., assignor to Standard Oil Development Company, a corporation of Delaware Application January 4, 1947, Serial No. 720,269

3 Claims. (Cl. 260—639)

This invention relates to the preparation of alcohols, and in particular to the preparation of secondary butyl alcohol.

It is well known in the art to prepare alcohols by the hydration of olefins, employing sulfuric acid as the hydrating agent. Particular alcohols can be prepared in this manner from selected olefins in relatively high concentration. From mixed hydrocarbon solutions, however, the production of alcohols presents difficulties because of the many side reactions that may occur as a result of the admixture of the olefins with other type hydrocarbons in admixture. The present invention is concerned with a means for concentrating suitable olefins from hydrocarbon solution and obtaining the olefins in such a high degree of concentrations to permit the hydration to prepare the desired alcohol without many disadvantageous side reactions.

The process of the invention consists essentially of preparing a highly concentrated olefin solution by the extractive distillation of a suitable hydrocarbon mixture and the treating of the resultant olefin concentration with weak sulfuric acid to produce an acid extract suitable for the production of the desired alcohol. Hydrocarbon mixtures, for example, commonly available in petroleum refineries contain the lower molecular weight saturated compounds in amounts ranging from 20% to 80% by volume and the olefins in amounts ranging from 10% to 50% by volume. In the case of the $C_4$ hydrocarbons, the butanes range in many mixtures from about 20% to 60% by volume and the butenes from 20% to 50% by volume, including isobutylene usually in amounts of about 15% by volume. Other hydrocarbon mixtures available in petroleum refineries contain substantial quantities of ethylene, propylene and the various $C_5$ olefinic compounds. The lower water-soluble monohydric alcohols may thus be conveniently prepared by the processing of this invention by employing the highly olefinic mixtures obtained from the cracking of petroleum stocks.

Concentration in the distillation step to a content of between 80% and 90% olefins has been found particularly advantageous because a higher acid extract saturation is thereby obtained and the acid raffinate solution containing a correspondingly high content of olefins can then be suitably recycled to the distillation system for reconcentration. At the present time, the treatment of cracking coil stocks by the processing of the present invention permits an efficient means for the production of secondary butyl alcohol from the $C_3$–$C_4$ fraction obtained from the fractionation of cracked refinery stocks. In these mixtures, propane, n-butane and isobutane are commonly present in amounts slightly greater than the corresponding unsaturated hydrocarbons.

In order that the invention may be more fully understood, the following specific description with reference to the accompanying flow diagram is presented. For purposes of illustration, the feed stock will be taken as consisting of a mixture of $C_4$ hydrocarbons obtained from the fractionation of cracking coil stocks for the production of secondary butyl alcohol. In the particular mixture taken, the butenes are present in a concentration of about 20% by volume.

The feed stock is first treated with 65% sulfuric acid to remove the major part of the isobutylene. Isobutylene is thus removed to avoid polymer formation during subsequent processing. The thus treated stock is then supplied through line 11 to the tower 10. The tower 10 is usually a bubble plate tower containing about 25 plates. The tower is equipped with an overhead vapor line 12, a condenser 13, a drum 14, a reflux line 15, a bottoms withdrawal line 16 and a closed steam coil 17. In the tower 10, polymers are removed and any alkyl esters of sulfuric acid present, such as are in any recycle stock or carried over from the extraction of the isobutylene, are hydrolyzed. The alcohols formed in the hydrolysis are rejected with the distillation residue consisting largely of polymer bottoms. Through the overhead line 12, the remaining $C_4$ material, consisting essentially of butanes and normal butenes, is passed. A portion of this overhead material is condensed in condenser 13 and, after passing through drum 14, is returned to the tower 10 through the reflux line 15. The major quantity of distillate, however, is passed into line 21 to tower 20. The polymer and other distillation residue products are removed through line 16.

The tower 20 is a distillation tower, usually of bubble cap type having about 50 plates. The tower 20 is equipped with an overhead vapor line 22, a condenser 23, a bottoms line 24 and a solvent supply line 25. Heat is supplied to the tower 20 by passing the heavier distillation ends through line 27 and reboiler 28 thereby obtaining heat exchange with solvent recycled through line 29 from the solvent concentration tower 80. The solvent employed in the tower 20 is aqueous acetone of between about 80% and 90% acetone concentration by weight. In this particular embodiment, the solvent consisted of 83% acetone concentration by weight in water. The extractive distillation in the tower 20 is effected by having a solvent-hydrocarbon ratio usually of about 3 parts of aqueous acetone to 1 part hydrocarbon on the feed supply. When operating as in this illustration, at 100 p. s. i. g., the temperature conditions are maintained in the tower so that in the top of the tower a temperature of 135° F. is maintained, while at the bottom of the tower, near the outlet piping 24, the temperature is maintained at 190° F. Taken overhead through line 22 is a distillate material of composition:

| | Per cent |
|---|---|
| Butanes | 95 |
| Butenes | 5 |

From the bottom of the tower, through line 24, the butenes and solvent are passed to the tower 30 through line 31.

The tower 30 is usually an ordinary bubble plate distillation tower containing about 25 plates. It is supplied with an overhead vapor line 32, a condenser 33 and a bottoms withdrawal line 34. The overhead containing 95% butenes is passed to the countercurrent extraction tower 40 through line 41. From the top of the tower, through line 45, water is passed into the tower 40. Overhead through line 42 the butenes are passed to the acid mixing unit 66 and thence to the reactor 60, through line 61. The bottoms from tower 40, consisting essentially of solvent, are passed through line 44 to the solvent concentrating tower 80, admitted through line 81.

The butenes in line 42 are contacted with sulfuric acid of between 70% and 93% concentration at temperatures from 75° F. for the strong acid concentration to 140° F. for the weak concentration, but preferably with acid between 80% and 83% concentration at about 85° F. In the present embodiment, acid of 83% concentration at 85° F. was employed. The acid is passed through line 62 and the mixture passed through equipment 66 and the tower 60. Recirculation of the mixture through this equipment 66 occurs from the bottom of the tower 60 through line 63. The reactor 60 is of the type commonly employed in alkylation and is fitted with a jet pipe 65 and the mixer 66 is of external wire mesh type. In the line 61, equipment 68 cools the acid-hydrocarbon stream to prevent undue rise of temperature. The acid solution is passed through line 64 to the settler 67. Separation of the phases occurs in the settler 67. The extract phase passes through line 71 to the tower 70, while the raffinate phase passes through line 69 into line 11 and thence into the distillation tower 10. In the tower 70, distillation is carried out and the crude alcohol is taken overhead through line 72. Acid is removed from the bottoms line 75 and passed, after cooling in 76, to the bottom of the tower 60 through line 66.

The overhead from tower 20, consisting essentially of butanes, is passed to the water wash tower 50, admitted through line 51. Water is admitted to the top of the tower through line 53. Passing overhead through line 52 are the spent butanes to a suitable disposal system. From the lower part of the tower 50, the water extract is removed through line 55.

The water extracts from towers 40 and 50 are combined in line 81 as a supply to the solvent concentration tower 80. The overhead from the tower 80 passes through line 82 and joins the solvent recycle line from the tower 30 and also joins the solvent supply line 25 for the tower 20.

Processing according to the invention is usually effected on a recycle basis. Thus, by the extractive distillation effected in tower 20 under the general conditions of processing previously given, a concentrated butene stream up to about 90% concentration may be obtained. The acid extraction unit 60 operating on such a highly concentrated normal butene feed as that containing between 80% and 90% normal butenes may be made to produce an extract of about 90% butenes and a raffinate of between 40% and 50%. The raffinate is subsequently reconcentrated to about 90% by fractional distillation and subsequent extractive distillation. This type processing may be readily applied to hydrocarbon mixtures containing the non-readily polymerizable unsaturated hydrocarbons. In such processing, the fractional distillation treatment removes the esters formed during the processing from this hydrocarbon phase. The extraction of high olefin content stocks with the sulfuric acid is generally advantageous because of the high absorption rate and low polymer formation. Furthermore, in such processing there is no need to strip completely in tower 70 the acid extract.

The processing described in this invention may be applied generally to the production of many monohydric alcohols, and particularly the secondary alcohols. In addition, the invention may be also applied by including or substituting other means of olefin concentration with crude alcohol production. As an illustration, for example azeotropic distillation with an appropriate solvent may be used to concentrate the olefins, and such processing may be combined with sulfuric acid distillation as previously described or with a process such as direct hydration in the presence of steam and a catalyst.

What is claimed is:

1. A process for the production of secondary butyl alcohol from a hydrocarbon mixture containing butanes and about 10-50 vol. percent normal butenes essentially free of isobutylene which comprises subjecting the hydrocarbon mixture to extractive distillation in a distillation zone in the presence of a solvent comprising aqueous acetone, removing the butanes overhead from the distillation zone, removing from the bottom of the distillation zone an aqueous acetone solution of hydrocarbons containing 80-90 vol. percent normal butenes, separating the hydrocarbons containing 80-90 vol. percent normal butenes from the aqueous acetone and contacting the hydrocarbons containing 80-90 vol. percent normal butenes with sulfuric acid of 70-93 wt. percent concentration at a temperature between about 75° F. and 140° F. until the normal butene content of the hydrocarbons is reduced to 40-50 vol. percent, separating a sulfuric acid extract phase and a raffinate phase consisting of hydrocarbons containing 40-50 vol. percent normal butenes, returning the raffinate phase to the extractive distillation zone and hydrolyzing the extract to recover secondary butyl alcohol therefrom.

2. A process according to claim 1 in which the solvent comprises aqueous acetone of between 80–90 wt. percent acetone.

3. A process according to claim 1 in which the hydrocarbons containing 80–90 vol. percent normal butene are contacted with 80–83 wt. percent sulfuric acid at a temperature of about 85° F.

JOHN A. PATTERSON.

REFERENCES CITED

The following references are of record in the file of this patent:

UNITED STATES PATENTS

| Number | Name | Date |
| --- | --- | --- |
| 1,948,286 | Brooks | Feb. 20, 1934 |
| 1,966,166 | Davies | July 10, 1934 |
| 1,967,399 | Engs et al. | July 24, 1934 |
| 2,190,501 | Brooks | Feb. 13, 1940 |
| 2,361,493 | Patterson | Oct. 31, 1944 |
| 2,371,342 | Mayfield | Mar. 13, 1945 |
| 2,372,941 | Evans et al. | Apr. 3, 1945 |
| 2,386,055 | Mottern | Oct. 2, 1945 |
| 2,388,971 | Hebshman | Nov. 13, 1945 |
| 2,407,997 | Patterson | Sept. 24, 1946 |